(12) United States Patent
Zhu et al.

(10) Patent No.: US 10,725,317 B2
(45) Date of Patent: Jul. 28, 2020

(54) NAKED EYE 3D LASER DISPLAY DEVICE

(71) Applicants: SVG Optronics, Co., Ltd., Jiangsu (CN); Soochow University, Jiangsu (CN)

(72) Inventors: Ming Zhu, Jiangsu (CN); Linsen Chen, Jiangsu (CN); Wenqiang Wan, Jiangsu (CN); Minghui Luo, Jiangsu (CN); Wen Qiao, Jiangsu (CN); Wenbin Huang, Jiangsu (CN); Yimin Lou, Jiangsu (CN); Donglin Pu, Jiangsu (CN); Pengfei Zhu, Jiangsu (CN)

(73) Assignees: SVG Optronics, Co., Ltd., Jiangsu (CN); Soochow University, Jiangsu (CN)

(*) Notice: Subject to any disclaimer, the term of this patent is extended or adjusted under 35 U.S.C. 154(b) by 112 days.

(21) Appl. No.: 15/533,322

(22) PCT Filed: Mar. 8, 2016

(86) PCT No.: PCT/CN2016/075836
§ 371 (c)(1),
(2) Date: Jun. 5, 2017

(87) PCT Pub. No.: WO2017/107313
PCT Pub. Date: Jun. 29, 2017

(65) Prior Publication Data
US 2017/0363877 A1 Dec. 21, 2017

(30) Foreign Application Priority Data
Dec. 22, 2015 (CN) .......................... 2015 1 0969723

(51) Int. Cl.
*G02B 30/27* (2020.01)
*G02B 30/00* (2020.01)
(Continued)

(52) U.S. Cl.
CPC ........... *G02B 30/27* (2020.01); *G02B 6/0035* (2013.01); *G02B 27/1086* (2013.01);
(Continued)

(58) Field of Classification Search
CPC .... G02B 27/22; G02B 27/2214; G02B 30/27; G02B 30/26; G02B 27/1086
(Continued)

(56) References Cited

U.S. PATENT DOCUMENTS 6,101,007 A 8/2000 Yamasaki et al.
6,604,839 B2* 8/2003 Coleman ............ G02B 27/1006
359/571

(Continued)

FOREIGN PATENT DOCUMENTS

CN 102096198 A 6/2011
CN 103091850 A 5/2013
(Continued)

OTHER PUBLICATIONS

Nikolai I. Petrov, Vladislav G. Nikitin, Viktor A. Danilov, Vladimir V. Popov, and Boris A. Usievich, "Subwavelength diffractive color beam combiner," Appl. Opt. 53, 5740-5744 (2014).*
(Continued)

*Primary Examiner* — Zachary W Wilkes
(74) *Attorney, Agent, or Firm* — Honigman LLP; Matthew H. Szalach; Jonathan P. O'Brien (57) ABSTRACT

A naked eye 3D display device is provided. The naked eye 3D display device includes a directional projection screen, a laser light source, a red monochromatic laser light source, a green monochromatic laser light source and a blue monochromatic laser light source. Lights emitted by the three monochromatic laser light sources emit incident light on the directional projection screen with nano-grating pixels at specific angles and specific positions, and the same emergent
(Continued)

light fields are formed. The laser light source provides multi-perspective image pixels. The multi-perspective image pixels match a nano-grating pixel array on the directional projection screen. By a direct spatial modulation for the laser projection light, colorful 3D display is achieved. There is no crosstalk between various viewpoints. The naked eye 3D display device has no visual fatigue and has a low cost.

11 Claims, 7 Drawing Sheets

(51) Int. Cl.
  *G02B 30/26* (2020.01)
  *G02B 27/10* (2006.01)
  *H04N 13/349* (2018.01)
  *F21V 8/00* (2006.01)
  *G02F 1/13357* (2006.01)

(52) U.S. Cl.
  CPC .............. *G02B 30/00* (2020.01); *G02B 30/26* (2020.01); *H04N 13/349* (2018.05); *G02F 1/133602* (2013.01)

(58) Field of Classification Search
  USPC ........................................ 359/619, 466, 566
  See application file for complete search history.

(56) References Cited

U.S. PATENT DOCUMENTS

| | | | | |
|---|---|---|---|---|
| 7,458,691 | B2* | 12/2008 | Duncan | G02B 5/32 |
| | | | | 359/558 |
| 9,128,226 | B2* | 9/2015 | Fattal | G02B 6/0068 |
| 9,459,461 | B2* | 10/2016 | Santori | G02B 27/22 |
| 9,460,665 | B2* | 10/2016 | Jiang | G09G 3/3413 |
| 9,756,317 | B2 | 9/2017 | Kim et al. | |
| 10,459,147 | B2* | 10/2019 | Ma | H04N 13/31 |
| 2003/0067460 | A1 | 4/2003 | Tomono | |
| 2004/0218270 | A1 | 11/2004 | Wang | |
| 2005/0264717 | A1 | 12/2005 | Chien et al. | |
| 2006/0033972 | A1 | 2/2006 | Takemori et al. | |
| 2012/0019883 | A1 | 1/2012 | Chae et al. | |
| 2012/0224246 | A1 | 9/2012 | Yeh et al. | |
| 2013/0114007 | A1 | 5/2013 | Lin et al. | |
| 2014/0192146 | A1 | 7/2014 | Park et al. | |
| 2014/0293759 | A1* | 10/2014 | Taff | G02B 27/2292 |
| | | | | 368/239 |
| 2014/0300960 | A1 | 10/2014 | Santori et al. | |
| 2015/0085331 | A1 | 3/2015 | Chae | |
| 2015/0205259 | A1 | 7/2015 | Kim et al. | |
| 2015/0316776 | A1 | 11/2015 | Gao et al. | |
| 2015/0370080 | A1* | 12/2015 | Meacham | G03B 21/60 |
| | | | | 359/458 |
| 2018/0292647 | A1* | 10/2018 | Fattal | G02B 27/0944 |

FOREIGN PATENT DOCUMENTS

| | | |
|---|---|---|
| CN | 103246195 A | 8/2013 |
| CN | 203337990 U | 12/2013 |
| CN | 103729673 A | 4/2014 |
| CN | 103982818 A | 8/2014 |
| CN | 104460115 A | 3/2015 |
| CN | 104865744 A | 8/2015 |
| CN | 105372824 A | 3/2016 |
| JP | H1114937 A | 1/1999 |
| JP | H11190969 A | 7/1999 |
| JP | 2003121786 A | 4/2003 |
| JP | 2004102075 A | 4/2004 |
| JP | 2006517307 A | 7/2006 |
| JP | 2012185464 A | 9/2012 |
| JP | 2012208224 A | 10/2012 |
| JP | 2013068886 A | 4/2013 |
| KR | 20120010554 A | 2/2012 |
| KR | 20140090838 A | 7/2014 |
| KR | 20150033501 A | 4/2015 |
| KR | 20150086799 A | 7/2015 |
| WO | WO-2014/051624 A1 | 4/2014 |

OTHER PUBLICATIONS

Japanese Patent Office, Office Action for JP Application No. 2017-531811, dated Jun. 26, 2018.
Korean Intellectual Property Office, Notification of Reason for Refusal for KR Application No. 10-2017-7020827, dated Jan. 8, 2018.
State Intellectual Property Office, First Office Action for CN Application No. 201510969723.7, dated Jun. 2, 2017.
State Intellectual Property Office as the International Searching Authority, International Search Report for PCT Application No. PCT/CN2016/075836, dated Sep. 12, 2016.

* cited by examiner

NAKED EYE 3D LASER DISPLAY DEVICE

The present application is the national phase of International Application No. PCT/CN2016/075836 titled "NAKED EYE 3D LASER DISPLAY DEVICE," filed on Mar. 8, 2016, which claims priority to Chinese Patent Application No. 201510969723.7, titled "NAKED EYE 3D LASER DISPLAY DEVICE", filed on Dec. 22, 2015 with the State Intellectual Property Office of the People's Republic of China, the entire contents of which are incorporated herein by reference.

TECHNICAL FIELD

The present disclosure relates to the field of laser display, and in particular to a laser display device which can realize a naked eye 3D display.

BACKGROUND

Parallax principle has been discovered more than 100 years. Although naked eye 3D display prototype is demonstrated by domestic and foreign enterprises, the naked eye 3D display device based on the parallax principle has not really entered the field of consumer electronics due to a low image resolution and easily generated visual fatigue. The parallax principle includes a parallax barrier method, a microcolumn lens method and a directional backlight method. A parallax barrier screen or a microcolumn lens plate covers a surface of a liquid crystal display (LCD), so as to achieve angle separation for images with different perspective in space. Based on the optics theory, the image is not unique in different space perspectives due to light source diffusion. Therefore, it is easy to cause visual fatigue when the human eye observes the 3D image.

In Chinese Patent Application CN20101058659.4, 2D/3D switching through a flexible slit grating is provided, but the display effect is greatly affected by the viewing position. In Chinese Patent Application CN201320143064.8, a 3D directional backlight imaging system is provided, which uses two projection lenses and a directional 3D optical structure to realize the naked eye 3D display. In Patent Application US20050264717A1, a 3D display device with a liquid crystal display and a directional backlight module is disclosed, which instantly switches on and off a left and a right backlight source, focuses, into a specific perspective range, the light transmitted through a light guide plate, and forms a 3D image through an alternating projection. With this directional backlight technique, only one person can observe although the image resolution is high. In Chinese Patent Application CN201410187534.X, a naked eye 3D backlight module is provided, which uses one or more sets of LED light sources in timing sequence, a convex lens, a polygon prism, and a parallax barrier, and achieves multi-perspective 3D display. However, backlight structure design and precision machining accuracy are difficult to achieve technically, and light crosstalk occurs easily. Thus, there are no actual samples or products of the naked eye 3D display device based on the proposed directional backlight method.

Dot matrix holography can provide a large perspective and reduce the amount of information, but the production of dot matrix grating pixels has been limited by the technique. In Chinese Patent Application CN201310166341.1, a printing method and system for a three-dimensional image is disclosed, in which a continuously changeable space frequency mechanism directly prints a static colorful stereoscopic image based on nano-grating pixels. The combination of the directional backlight display technique and the directional lighting technique to achieve 3D display, is a new technology arising recently. However, it is difficult to design and manufacture the directional backlight, and the manufacturing cost is high.

A hologram is an image carrying amplitude and phase information, which can truly reproduce three-dimensional information without generating visual fatigue. The three-dimensional effect is unrelated to a distance from an observer. The principle of holographic display may be summarized as follows: a three-dimensional virtual image or a three-dimensional real image can be reproduced in the space by the hologram, each point on the hologram transmits information in all directions of the space, and the entire image can be seen at each observation point in the space. In other words, the image information propagates through a light field and converges to the observation point. Therefore, at different observation points in the space, the entire image can be seen at different perspectives without interfering with each other. However, due to limitation in recording materials, amount of information and technical process of hologram, the industrial application of the holographic display has not been achieved for decades.

A dynamic colorful 3D display may be realized by a holographic waveguide backlight structure, which has a large perspective and is suitable for mobile display. In Chinese Patent Application CN201410852242.3, a solution for realizing a dynamic three-dimensional display using a multi-layer directional light guide structure which is made of nano pixel gratings. In Patent Application US20140300960A1, a directional backlight structure is provided, which modulates a distribution of an emergent light field using a pixelated grating, and couples the light of R, G, B through a hexagonal or triangular waveguide structure, so as to realize a directional modulation of a color light. In Patent Application US20140293759A1, a multi-perspective 3D wrist watch structure is provided, which modulates a light field using a pixelated grating structure, and refreshes an LCD image, so that a 3D display is achieved. Similarly, the hexagonal or triangular waveguide structure couples the light of R, G, B to achieve a colorful display. However, in the above patent applications, the hexagonal or triangular waveguide structure is adopted, which is difficult to be applied to a current mainstream display mode, especially is difficult to be applied to a rectangular display of smart phones, thus is disadvantageous for a large-scale industrial production.

In Patent Application WO2014/051624 A1 of Hewlett-Packard Company, a directional backlight integrated with hybrid laser waveguide arrays is disclosed, so as to achieve a multi-perspective display. The waveguide array is adopted to couple the light of red, green and blue, and the light is exported directionally through a pixelated grating. Although a colorful 3D display can be achieved with this method, the image resolution is greatly reduced due to a multi-waveguide array, and the accuracy requirement for the manufacturing process of the directional backlight structure is high.

The laser display is to perform scanning on the screen using light-spots of the red, green, blue, so as to form an image. With a wide color gamut, a high brightness, and a large breadth, the laser display is an important way to achieve a large size display in the future. However, there is no laser-based naked eye 3D display solution at present. Therefore, a naked eye 3D display device which has no visual fatigue, and has a wide color gamut, a high brightness and a large breadth is urgently needed in the industry.

SUMMARY

In view of the above, a naked eye 3D laser display device based on the holographic principle is provided. The naked eye 3D laser display device includes a directional projection screen which includes a nano-grating structure, and the naked eye 3D laser display device has no visual fatigue and has a high brightness, a wide color gamut, and a large breadth due to combination of the lighting of a specific light source and the laser display technology. The naked eye 3D display device includes a directional projection screen which includes a nano-grating pixel array. A multi-perspective image on the screen is provided by scanning (projecting) of a laser light source. A relationship between a period and an orientation angle of a nano-grating inside the pixel satisfies the holographic principle. The nano-grating pixel array performs wavefront transformation on an incident perspective image. Parallel light or divergent light are converged to form a convergent viewpoint in the space in front of the screen. The multi-perspective image is provided through laser scanning (projection engine), thus a modulation (scanning or projection) may be performed directly on a projective laser beam, and pixels of the multi-perspective image may correspond to the nano-grating pixels on the directional projection screen. The essence is the imaging through holographic wavefront transformation, where the perspective information is transformed into phase viewpoints, and images from different perspectives form a group of convergent light fields (multi-viewpoint), to form a horizontal window, and to avoid crosstalk between the images from different perspectives. Therefore, no visual fatigue is generated while observing near, before or behind the window, and a realistic stereoscopic image may be seen.

The naked eye 3D laser display device provided according to an objective of the present disclosure, includes a directional projection screen, a laser light source, and three red/green/blue monochromatic laser light sources. Multiple nano-grating structures are arranged on a light-emitting surface of the directional projection screen, the multiple nano-grating structures constitute multiple nano-grating pixel arrays, the multiple nano-grating structures have different periods and orientation angles. The laser light source provides multi-perspective image pixels, and the multi-perspective image pixels matches the multiple nano-grating pixel arrays on the directional projection screen. The three red/green/blue monochromatic laser light sources emit incident light on a corresponding target nano-grating from different angles, the red, green, and blue light from the target nano-grating are converged by the directional projection screen to one emitting direction and one spatial viewpoint, and a convergent viewpoint is formed by imaging of perspective images. The multiple nano-grating pixel arrays in different groups have different horizontal convergent viewpoint positions, and the directional projection screen, the laser light source, the three red/green/blue monochromatic laser light sources operate in combination through direct spatial modulation to realize a stereoscopic image display.

Preferably, incident angles of monochromatic laser light sources incident on the one corresponding nano-grating are different from each other. An incident angle of the red monochromatic laser light source is greater than an incident angle of the green monochromatic laser light source, and the incident angle of the green monochromatic laser light source is greater than an incident angle of the blue monochromatic laser light source. The incident angles and positions of the three red/green/blue monochromatic laser light sources are calculated according to a grating equation and a holographic imaging formula.

Preferably, viewpoints of the multiple nano-grating pixel arrays are distributed continuously and horizontally.

Preferably, the nano-grating structures with different directions are etched on a surface of the directional projection screen by photoetching, or the nano-grating structures are imprinted in batches by nano-imprinting, using a template for imprinting, so as to form the multiple nano-grating pixel arrays.

Preferably, the laser light source adopts a center of a plane as a zero position in an X-axis direction. In a YZ plane, three light sources are at a same position in a Y-axis direction and at different positions in a Z-axis direction. The multiple nano-grating structures correspond to multiple viewpoints respectively, each of the multiple viewpoints corresponds to one image, and each image corresponding to each of the multiple viewpoints is divided into three monochromatic images based on three colors of RBG or based on other three colors. The laser light source scans, more than once, a monochromatic image on the directional projection screen, of which a color corresponds to a perspective. Three monochromatic laser light sources with different wavelengths scan synchronously, and each of the monochromatic laser light sources scans more than once. The directional projection screen converges three monochromatic laser light and realizes a colorful stereoscopic image display.

Preferably, the periods and orientation angles of the nano-grating structures are calculated according to the grating equation which satisfies:

$$\tan \varphi_1 = \sin \varphi/(\cos \varphi - n \sin \theta(\Lambda/\lambda)) \quad (1)$$

$$\sin^2(\theta_1) = (\lambda/\Lambda)^2 + (n \sin \theta)^2 - 2n \sin \theta \cos \varphi(\lambda/\Lambda) \quad (2)$$

The $\theta_1$ and $\varphi_1$ represent a diffraction angle and an azimuth of diffractive light respectively, $\theta$ and $\lambda$ represent an incident angle and a wavelength of a monochromatic laser light source respectively, $\Lambda$ and $\varphi$ represent a period and an orientation angle of the multiple nano-grating structures respectively, and n represents a refractive index of the light wave in a medium.

Preferably, the directional projection screen is chosen to be a transmission type or a reflection type base on an incidence mode.

Preferably, a directional projection screen of a reflection type is formed by plating metal on a surface of a directional projection screen of a transmission type.

Preferably, the directional projection screen is chosen to be the transmission type. The red, green, and blue light are incident from a same position on a back surface of the directional projection screen, passes through nano-gratings arranged on a front surface of the directional projection screen, and form emergent light with a same diffraction angle.

Preferably, the directional projection screen is chosen to be the reflection type. The red, green, and blue light are incident from a same position on a front surface of the directional projection screen, passes through nano-grating pixels arranged on the front surface of the directional projection screen, and form emergent light with a same diffraction angle.

Preferably, in a case that the directional projection screen is chosen to be the transmission type, the laser light source is at a zero position in an X-axis direction in a XZ plane, and three light sources are at a same position in a Y-axis direction and at different positions in a negative direction of a Z-axis in a YZ plane; in a case that the directional projection screen is chosen to be the reflection type, the laser light source is at the zero position in the X-axis direction in the XZ plane, and the three light sources are at a same position in a Y-axis direction and at different positions in a positive direction of a Z-axis in the YZ plane.

Compared with the prior art, the present disclosure has the following advantages.

(1) The directional projection screen includes nano-grating pixel arrays, and performs the imaging through wavefront transformation. The multi-perspective image which is projected on the screen by the laser is transformed into a wavefront with a convergence function. The directional projection screen performs the wavefront transformation on the image, and to form convergent multi-viewpoint. The wavefronts (viewpoints) do not interfere with each other due to independent propagation of phase (perspective) and amplitude (image) information carried by the spacial wavefronts. When human eyes observe, no visual fatigue is generated, and the stereoscopic effect is not related to a position of an observer, which protects vision. A space information (phase) modulation is provided by the directional projection screen, and a perspective image information (amplitude) modulation is provided by the laser light source scanning (projection). The combination of these two modulations provide all information for the holographic display. Also, the observable perspective for 3D images can be 150 degrees or more due to the nanostructures.

(2) Light-spots of the red, green and blue laser are projected onto the same pixel array from different perspectives. Through spatial multiplexing of the nano-grating pixel array, the red, green and blue perspective images are combined on the emergent surface. In this way, only sub-pixel array decomposition is required for the perspective images, without pixel decomposition for the colors. The 3D display resolution is maintained and color combination for 3D images is achieved.

(3) The relationship among the nano-grating pixel arrays on the directional projection screen satisfies the holographic principle, and the wavefront transformation and imaging of the light on the directional projection screen are achieved through diffraction, rather than diffusion on a diffusion screen of a conventional laser display. Thus, the nano-grating screen of the present disclosure reduces a speckle effect of the laser display, and retains advantages of a high brightness, a large breadth and a wide color gamut.

(4) The directional projection screen is pixelated, the size of one single pixel may be adjusted according to a screen resolution, and 2D/3D switching is achieved. Multi-perspective images respectively correspond to the directional pixels, and a 3D image display is achieved. With single-perspective images rather than multi-perspective images, a 2D display may be achieved. The size of pixel may be very small, which does not affect the 2D image resolution of the display screen.

(5) The directional nano-grating may be manufactured by etching on a film surface using nano-lithography. Optionally, the directional nano-grating may be manufactured in batches by nano-imprinting, using a template for imprinting which is made through nano-lithography, thereby reducing a cost of the screen.

(6) The directional projection screen may be a transmission type or a reflection type. A screen of a reflection type may be achieved through plating metal on the surface of a screen of a transmission type.

(7) The directional projection screen has a function of convergence imaging for image from each perspective, and the convergent viewpoint formed thereby forms a light field or a window which is horizontally arranged.

(8) The period, orientation angle and azimuth of the nano-grating in the directional projection screen can be calculated according to the holographic principle and a grating equation. The incident angles of red, green and blue light can be calculated according to the grating equation, and the positions of the red, green and blue light can be calculated according to a holographic imaging formula. These calculations are convenient and accurate.

BRIEF DESCRIPTION OF THE DRAWINGS

The drawings used in the description of the embodiments will be described briefly as follows, so that the technical solutions according to the embodiments of the present disclosure will become more clear. It is apparent that the drawings in the following description show only some embodiments of the present disclosure. For those skilled in the art, other drawings may be obtained according to these drawings without any creative work.

DETAILED DESCRIPTION OF THE EMBODIMENTS

As described in the background, there is no naked eye 3D display device based on laser in the prior art. There are technical issues for the conventional 3D display device, for example, low resolution, crosstalk of light, high manufacturing cost, and difficulty for large-scale production.

The specific technical solutions of the present disclosure is described in detail as follows.

Figure 1:
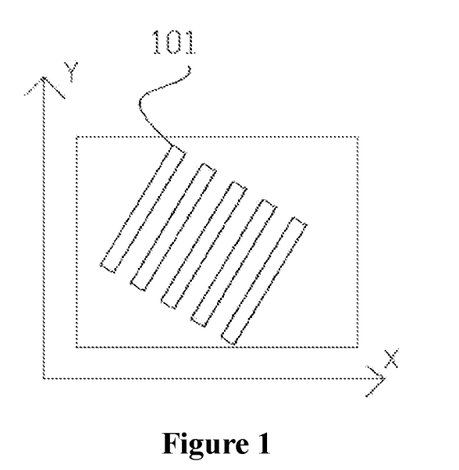
FIG. 1 is a structural diagram of nano-gratings inside a pixel on a directional projection screen in a XY plane.
Figure 2:
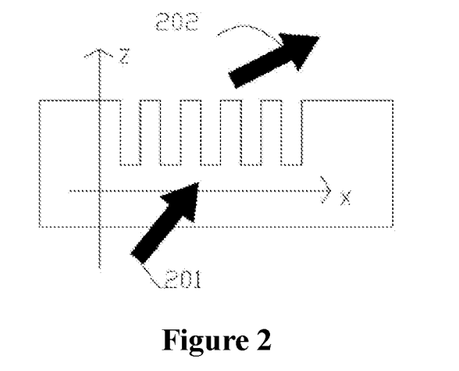
FIG. 2 is a structural diagram of the nano-gratings inside the pixel on the directional projection screen in FIG. 1 in a XZ plane.

Reference is made to FIGS. 1 to 2, which show diffraction gratings in nanometers in a XY plane and a XZ plane respectively. According to the grating equation, a period and an azimuth of the diffraction grating pixel 101 satisfies the following relationship.

$$\tan \varphi_1 = \sin \varphi/(\cos \varphi - n \sin \theta(\Lambda/\lambda)) \tag{1}$$

$$\sin^2(\theta_1) = (\lambda/\Lambda)^2 + (n \sin \theta)^2 - 2n \sin \theta \cos \varphi(\lambda/\Lambda) \tag{2}$$

The light is incident on the XY plane at an angle. $\theta_1$ and $\varphi_1$ represent a diffraction angle (angle between a diffractive light and a positive direction of a z axis) and an azimuth (angle between the diffractive light and a positive direction of an x axis) of the diffractive light respectively, $\theta$ and $\lambda$ represent an incident angle (angle between an incident light and a positive direction of a z axis) and a wavelength of a light source 201 respectively, $\Lambda$ and $\varphi$ prespectively represent a period and an orientation angle (angle between a direction along a groove and a positive direction of a y axis) of a nano diffraction grating 101, and n represents a refractive index of the light wave in the medium. In other words, once the wavelength and the incident angle of the incident light and the diffraction angle and the azimuth of the diffractive light are determined, the period and orientation angle of the nano-grating may be calculated according to the above two equations. For example, in a case that a red light of which the wavelength is 650 nm is incident at 60 degrees, the diffraction angle is 10 degrees, the azimuth of the diffractive light is 45 degrees, the corresponding period of the nano-grating is 550 nm, and orientation angle of the nano-grating is −5.96 degrees according to calculation. Therefore, the period, orientation angle and azimuth of the nano-grating is calculated according to the holographic principle and the grating equation.

According to the above principle, each nano-grating is regarded as a pixel. Multiple nano-gratings with different orientation angles and periods as required are manufactured on a screen surface. Theoretically, enough viewpoints may be obtained, and together with the color and gray control, the naked eye 3D display from multi-perspective can be achieved. The perspective range of multiple pixel arrays is between plus 90 degrees and minus 90 degrees.

However, after the screen having the above nano-grating is applied to a laser display module, there are the following issues: light sources with different wavelengths correspond to different periods of nano-gratings. For the same directional projection screen module, if R, G and B light sources with three different wavelength are incident with the same angle, the diffraction angles of the R, G and B light must be different, that is, the R, G and B light are not on the same focus. However, colorful imaging relies on a combination of three colors of RGB (or other three colors). It means that in a case that light sources with 3 colors are used in one directional projection screen module, the light sources with 3 colors must be incident on the corresponding nano diffraction grating pixel with different angles.

To address the above technical issues, the same diffraction angle and the same spacial viewpoint are formed after the light of three colors of RGB (or other three colors) pass through one directional projection screen module. In this disclosure, the light of three colors of RGB (or other three colors) are incident on the directional projection screen with a specific angle and position to form a viewpoint (convergent point) of which light fields of different wavelengths have a same position. RGB light with different wavelengths are projected on the same position of the screen, a colorful combination for the 3D image is achieved through spatial multiplexing of the nano-grating. The incident angle is an angle between the incident light and a normal line of a plane where the directional projection screen is located, and the range of the incident angle is from 0 degree to 90 degrees.

Figure 3:
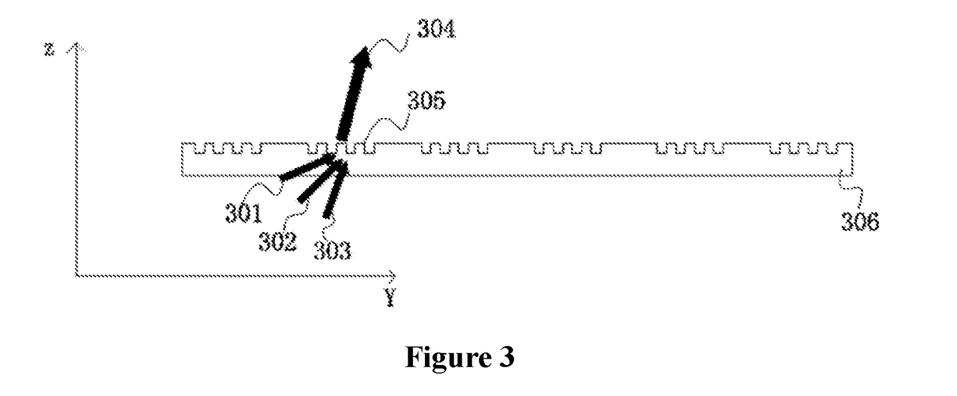
FIG. 3 is a structural diagram of a directional projection screen module of a transmission type in a YZ plane according to an embodiment of the present disclosure.

Reference is made to FIG. 3, which is a structural diagram of a directional projection screen module of a transmission type in a YZ plane according to an embodiment of the present disclosure. The directional projection screen module includes a directional projection screen 306 having a nano diffraction grating pixel, a red light source 301, a green light source 302 and a blue light source 303. The three light source are at different positions in the Z axis direction in the YZ plane. Light of the red light source 301, the green light source 302 and the blue light source 303 are incident on the nano diffraction grating pixel 305 on the directional projection screen 306 with different incident angles, are transmitted and diffracted by the nano-grating pixel 305, and form a diffraction light path 304 with the same diffraction angle.

Figure 4:
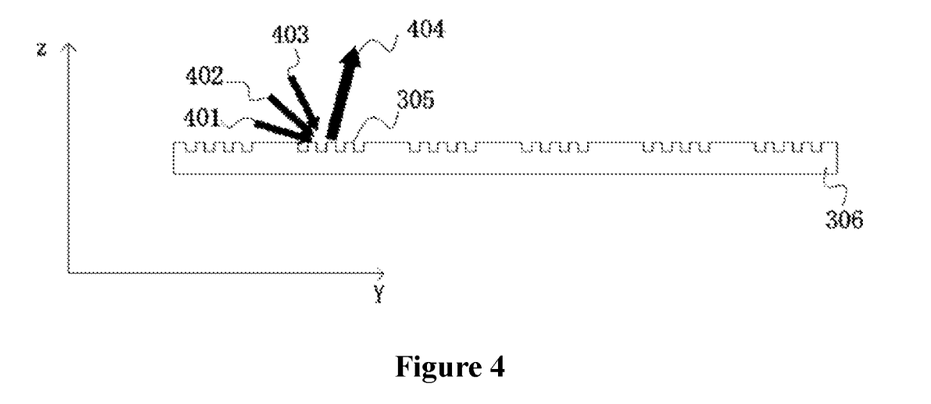
FIG. 4 is a structural diagram of a directional projection screen module of a reflection type in a YZ plane according to an embodiment of the present disclosure.

Reference is made to FIG. 4, which is a structural diagram of a directional projection screen module of a reflection type in an YZ plane according to an embodiment of the present disclosure. The directional projection screen module includes a directional projection screen 306 having a nano diffraction grating pixel, a red light source 401, a green light source 402 and a blue light source 403. The three light source are at different positions in the Z axis direction in the YZ plane. Light of the red light source 401, the green light source 402 and the blue light source 403 are incident on the nano diffraction grating pixel 305 on the directional projection screen 306 with different incident angles, are reflected and diffracted by the nano-grating pixel 305, and form a diffraction light path 404 with the same diffraction angle.

Figure 5:
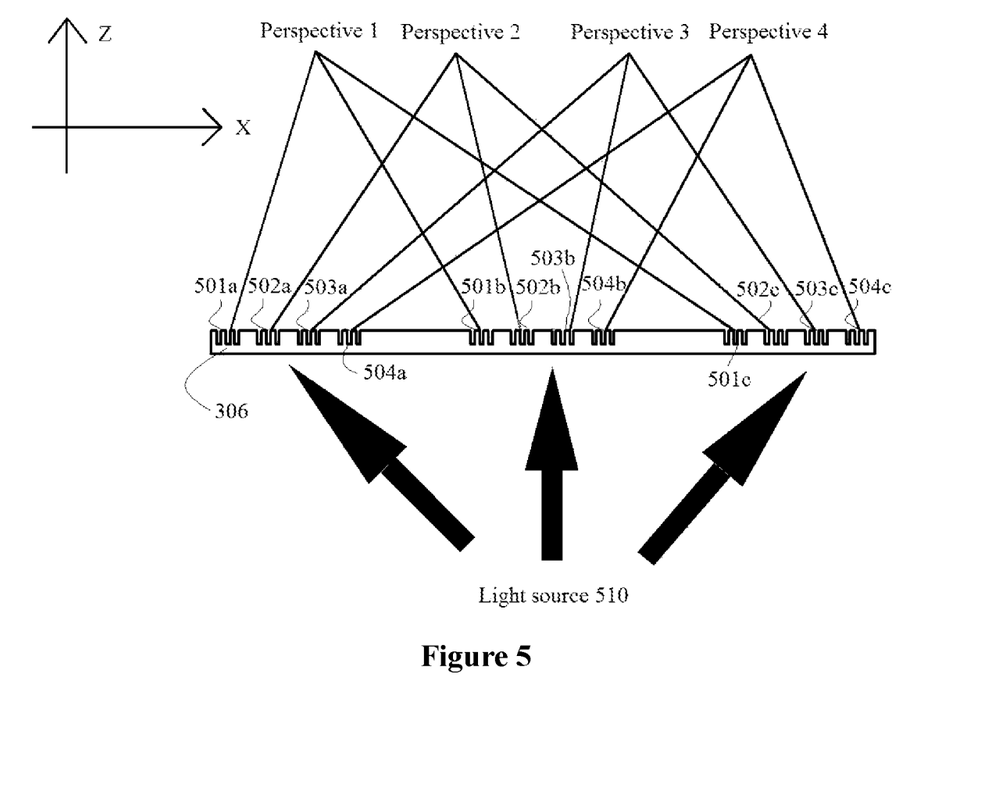
FIG. 5 is a structural diagram of a 3D display device formed by directional projection screen modules of a laser scanning transmission type in a XZ plane according to the present disclosure.

Reference is made to FIG. 5, which is a structural diagram of a 3D display device formed by directional projection screen modules of a laser scanning transmission type in a XZ plane according to the present disclosure. The 3D display device includes a directional projection screen 306 having a nano-grating pixel as described above and three light sources (not shown in the drawing) of RGB (or other three colors). The laser light source is at a zero position in an X-axis direction (takes the center of the plane as the zero position). In the YZ plane, three light sources are at the same position in a Y-axis direction and at different positions in a negative direction of a Z-axis (the positive direction is perpendicular to the emergent surface and points to the direction of observation). As shown in the drawing, pixels 501a-501c, 502a-502c, 503a-503c and 504a-504c on the directional projection screen 306 correspond to a viewpoint 1, a viewpoint 2, a viewpoint 3 and a viewpoint 4 respectively. This allows viewpoints of images from four perspectives to separate from each other, with each viewpoint corresponding to one image. The image corresponding to each viewpoint is divided into three monochromatic images based on three colors of RBG (or other three colors). As shown in FIG. 5, a monochromatic laser light source 510 scans, four times, monochromatic images of corresponding colors from each perspective on the directional projection screen 306. For example, pixels 501a-501c, 502a-502c, 503a-503c and 504a-504c are scanned, diffractive light of the corresponding viewpoint 1, viewpoint 2, viewpoint 3 and viewpoint 4 are generated by transmission, and stereoscopic monochromatic images from four perspectives are formed. Three laser light sources with different wavelengths (not shown in the drawings) scan simultaneously, each laser light source corresponding to one color scans four times, and a colorful stereoscopic image is displayed in space after converging of the directional projection screen. Generally, it is practical to assume that a size of a display screen is 55 inches, the viewing distance is 3 m, the resolution required for a human eye is satisfied, and a pixel size for a single image is 800 um. At present, a 20 um pixel can be manufactured in the prior art. Therefore, projection for 1600 viewpoints can be achieved theoretically, and a realistic stereoscopic image may be formed. Further, the period of the nano-grating can be 430 nm, and the diffusion range of the image can reach 150 degrees or even larger. According to the grating equation, the range for the period of the nano-grating is from 430 nm to 650 nm. The number of viewpoints in the drawings is not limited to be 4, and may be 8, 16, or more. More viewpoints may be adopted to achieve continuous changes of the stereoscopic images and to achieve a larger perspective of observation.

Figure 6:
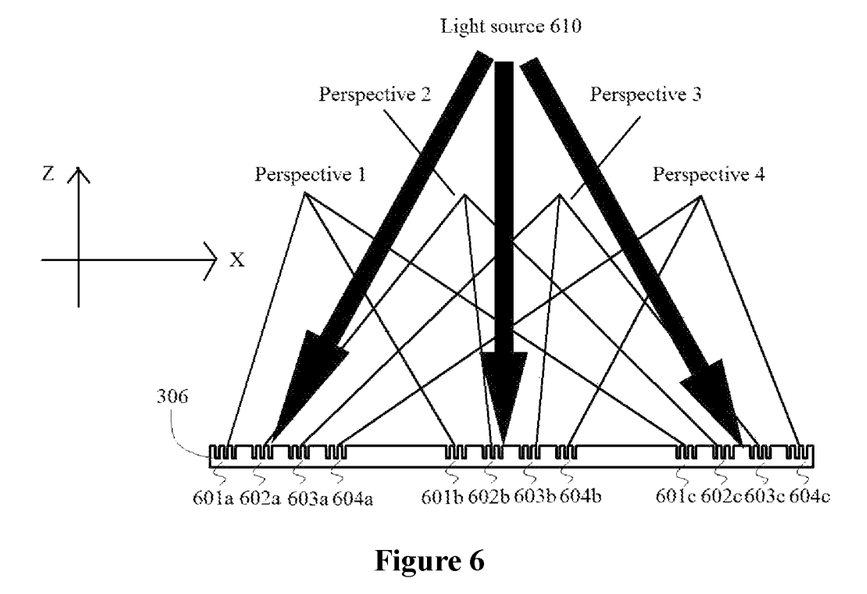
FIG. 6 is a structural diagram of a 3D display device formed by directional projection screen modules of a laser scanning reflection type in a XZ plane according to the present disclosure.

Reference is made to FIG. 6, which is a structural diagram of a 3D display device formed by directional projection screen modules of a laser scanning reflection type in a XZ plane according to the present disclosure. The 3D display device includes a directional projection screen 306 having a nano-grating pixel as described above and three light sources (not shown in the drawings) of RGB (or other three colors). The laser light source is at a zero position in an X-axis direction (takes the center of the plane as the zero position). In the YZ plane, the three light sources are at the same position in a Y-axis direction and at different positions in a positive direction of a Z-axis. As shown in the drawing, pixels 601a-601c, 602a-602c, 603a-603c and 604a-604c on the directional projection screen 306 correspond to a viewpoint 1, a viewpoint 2, a viewpoint 3 and a viewpoint 4 respectively. This allows images from four perspectives to separate from each other, with each viewpoint corresponding to one image. The image corresponding to each viewpoint is divided into three monochromatic images based on three colors of RBG (or other three colors). As shown in FIG. 6, a monochromatic laser light source 610 scans, four times, monochromatic images of corresponding colors from each perspective on the directional projection screen 306. For example, the pixels 601a-601c, 602a-602c, 603a-603c and 604a-604c are scanned, diffractive light of the corresponding viewpoint 1, viewpoint 2, viewpoint 3 and viewpoint 4 are generated by reflection, and stereoscopic monochromatic images from four perspectives are formed. Three laser light sources with different wavelengths (not shown in the drawings) scan simultaneously, the laser light source corresponding to each color scan four times, and a colorful stereoscopic image is displayed in space after converging of the directional projection screen. The number of viewpoints in the drawings is not limited to be 4, and may be 8, 16, or more. More viewpoints may be adopted to achieve continuous changes of the stereoscopic images and to achieve a larger perspective of observation.

Figure 7:
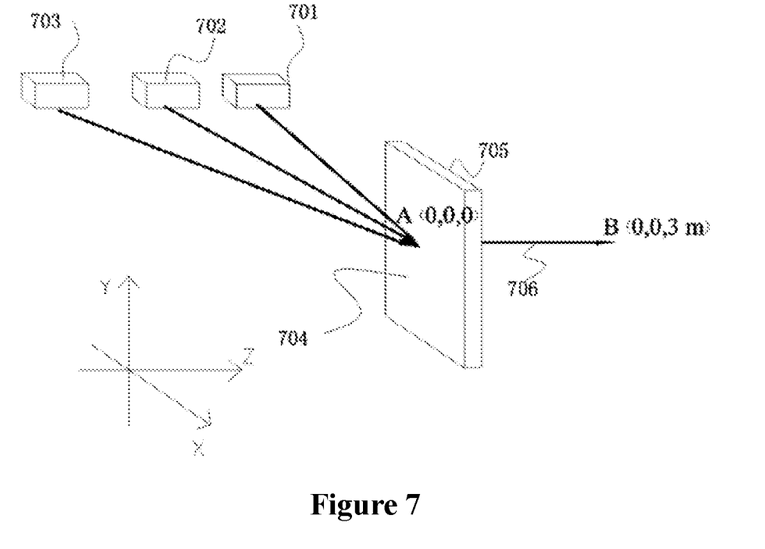
FIG. 7 is a diagram of a position of a laser light source in a directional projection screen device of a laser scanning transmission type according to the present disclosure.

Reference is made to FIG. 7, which is a diagram of a position of a laser light source in a directional projection screen device of a laser scanning transmission type according to the present disclosure. According to the grating equation, diffraction angles of light with different wavelengths which pass through the grating are different. In the same period, the diffraction angle of the red light is the largest, the diffraction angle of the green light is smaller than that of the red light, and the diffraction angle of the blue light is the smallest. Therefore, in order to converge the light of three colors, which pass through the directional projection screen 306, into the same direction, the incident angle and position of the red, green and blue laser light sources must be calculated based on the grating equation and holographic imaging formula. The incidence angle may be calculated based on the grating equation, and the position may be calculated based on the holographic imaging formula. The light of three colors, i.e., red light 701 (having a large incidence angle), green light 702 (having a moderate incident angle), a blue light 703 (having a small incident angle), is incident from the same position on a back surface 704 of the directional projection screen, and forms a emergent light 706 with the same diffraction angle after passing through the nano-grating pixels distributed on a front face 705 of the directional projection screen. For example, the red light 701 with a wavelength of 650 nm, the green light 702 with a wavelength of 532 nm, the blue light 703 with a wavelength of 450 nm are incident, at different angles, onto a center position A (0,0,0) of the screen. In order to make the exit angles of the emergent light same, for example, to make the emergent light transmit to a position B (0,0,3m), it is assumed that the incident angle (the angle between the incident light and the normal of the incident plane) of the red light 701 is 60 degrees, and then the incident angles of the green light 702 and the blue light 703 may be calculated to be 45.1 degrees and 36.8 degrees respectively according to the formula, and the period and the orientation angle (the angle between the direction of a grating line and the x axis) of the pixel grating are 500 nm and 0 degree respectively. Further, in view of the case that the light with different wavelengths converges at the same position after passing through the directional projection screen 306, the positions of the red, green and blue laser light sources must satisfy the holographic imaging equation. Through multiple groups of off-axis Fresnel holographic lens formed by nano-gratings on the screen, the imaging position for long wavelength light is far and the imaging position for short wavelength light is near. The distance from the laser light source of red light 701 to the screen is small, the distance from the laser light source of green light 702 to the screen is moderate, and the distance from the laser light source of blue light 703 to the screen is large, therefore, a colorful combination of imaging for wavelengths of three colors and a fidelity of color reproduction of a combined 3D image are achieved. For example, it is assumed that the red light 701 with a wavelength of 650 nm is incident at an angle of 60 degrees, and the position coordinates of the corresponding light source is (0, 60 cm, 34.6 cm). In order to converge the light of three colors to the same focus on one directional projection screen 306, the position coordinates of the green light source for the green light 702 with a wavelength of 532 nm is (0, 60 cm, 59.8 cm), and position coordinates of the blue light source for the blue light 703 with a wavelength of 450 nm is (0, 60 cm, 80.2 cm) according to calculation.

Figure 8:
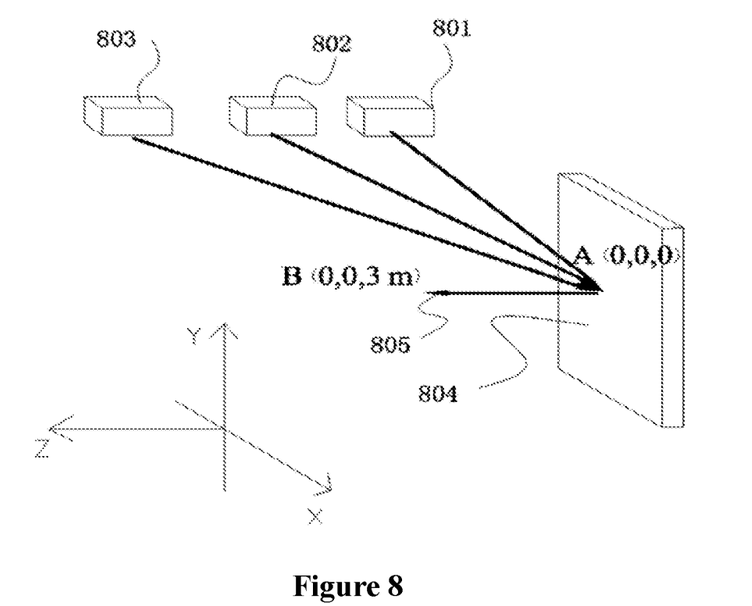
FIG. 8 is a diagram of a position of a laser light source in a directional projection screen device of a laser scanning reflection type according to the present disclosure.

Reference is made to FIG. 8, which is a diagram of a position of a laser light source in a directional projection screen device of a laser scanning reflection type according to the present disclosure. According to the grating equation, diffraction angles of light with different wavelengths which pass through the grating are different. In the same period, the diffraction angle of the red light is the largest, the diffraction angle of the green light is smaller than that of the red light, and the diffraction angle of the blue light is smallest. Therefore, in order to converge the light of three colors which pass through the directional projection screen 306 to the same direction, the incident angles and positions of the red, green and blue laser light sources must be calculated based on the grating equation and holographic imaging formula. The incidence angle may be calculated based on the grating equation, and the position may be calculated based on the holographic imaging formula. The red light 801 (having the largest incidence angle), green light 802 (having the moderate incident angle), and blue light 803 (having the smallest incident angle) are incident from the same position on a front surface 804 of the directional projection screen, pass through the nano-grating pixels distributed on the front face 804 of the directional projection screen, and form emergent light 805 with the same diffraction angle. For example, the red light 801 with a wavelength of 650 nm, the green light 802 with a wavelength of 532 nm, the blue light 803 with a wavelength of 450 nm are incident at different angles onto a center position A (0,0,0) of the screen. In order to make the exit angles of the emergent light same, for example, to make the emergent light transmit to a point position B (0,0,3m), it is assumed that the incident angle (a angle between the incident light and a normal of the incident plane) of the red light 801 is 60 degrees, and then the incident angles of the green light 802 and the blue light 803 may be calculated to be 45.1 degrees and 36.8 degrees respectively according to the formula, and the period and the orientation angle (the angle between the direction of grating line and the x axis) of the pixel grating are 500 nm and 0 degree respectively. Further, in view of the case that the light with different wavelengths converges at the same position after passing through the directional projection screen 306, the positions of the red, green and blue laser light sources must satisfy the holographic imaging equation. Through multiple groups of off-axis Fresnel holographic lens formed by nano-gratings on the screen, the imaging position for long wavelength light is far and the imaging position for short wavelength light is near. The distance from the laser light source of red light 701 to the screen is small, the distance from the laser light source of green light 702 to the screen is moderate, and the distance from the laser light source of blue light 703 to the screen is large, therefore, a colorful combination of imaging for wavelengths of three colors and a fidelity of color reproduction of a combined 3D image are achieved.

Figure 9:
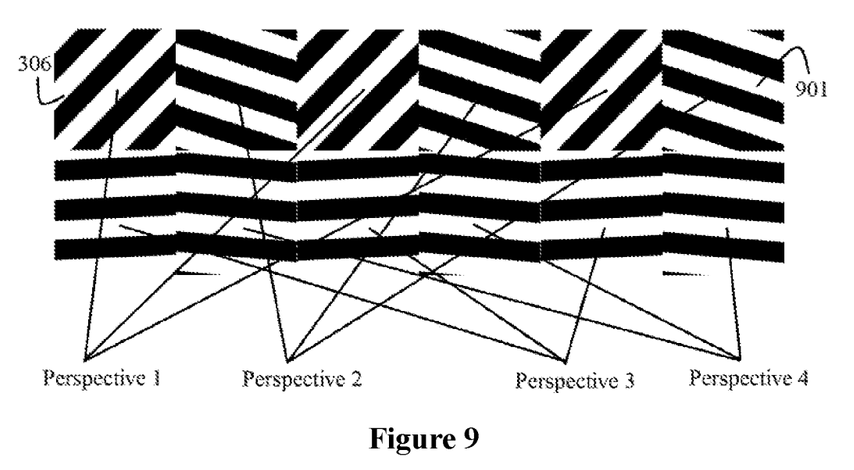
FIG. 9 is a structural diagram of nano-gratings on a multi-perspective directional projection screen.
Figure 10:
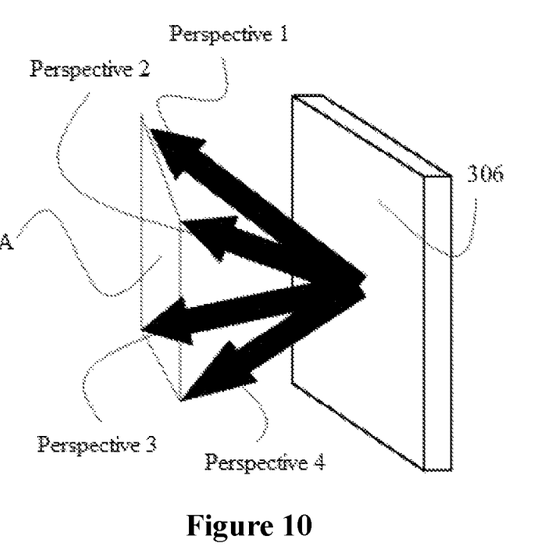
FIG. 10 is a diagram of viewpoints of a pixel array distributed in N*N two-dimensional planes.

Reference is made to FIG. 9, which is a structural diagram of a nano-grating on a multi-perspective directional projection screen. The laser light source is transmitted, reflected, or diffracted by the directional projection screen 306, and the viewpoints are separated in space. The images from different perspectives of the nano structures 901 of the directional projection screen 306 converge in front of the directional projection screen, and observation windows for different perspectives are formed. As shown in the figure, observation windows for perspective 1, perspective 2, perspective 3 and perspective 4 are formed. The nano structures 901 have different periods and orientation angles, which correspond to multiple off-axis Fresnel hologram structures. The viewpoints of multiple pixel arrays are distributed continuously and horizontally. The distribution of the viewpoints is not limited to the horizontal distribution, and may be alternatively an N*N two-dimensional planar distribution. Reference is made to FIG. 10, which shows a 2*2 two-dimensional planar distribution of viewpoints formed by the directional projection screen 306. Focuses of the perspective 1, the perspective 2, the perspective 3, and the perspective 4 are in the 2*2 two-dimensional distribution on a common space plane A.

Figure 11:
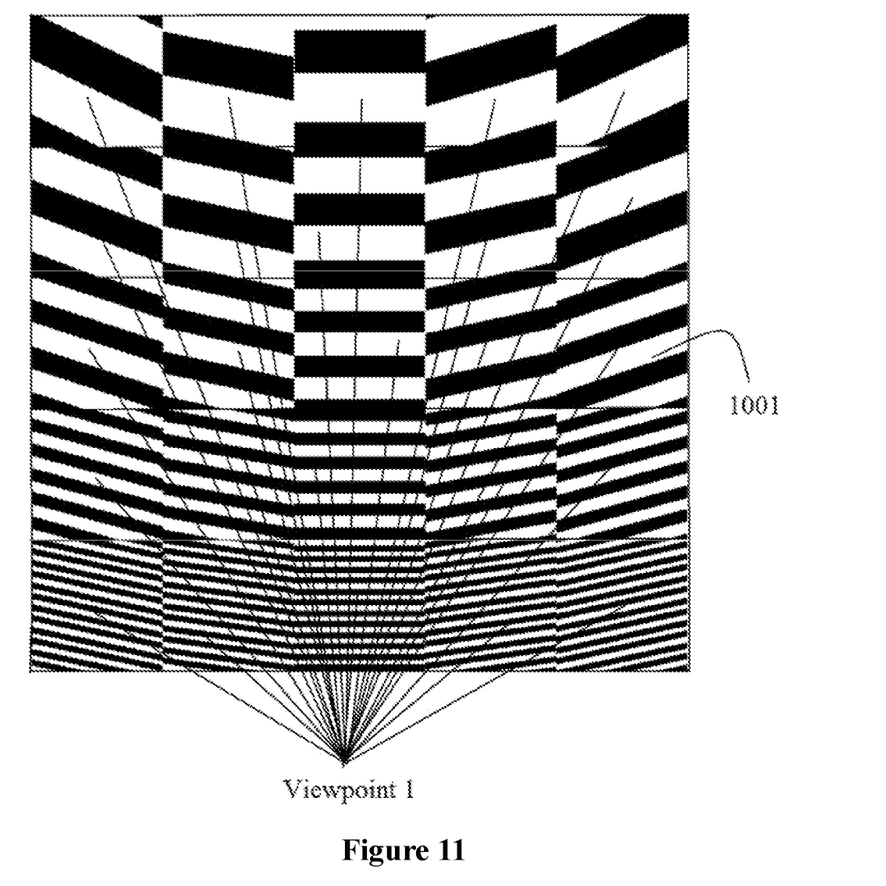
FIG. 11 is a diagram of distribution of nano structures of a directional projection screen that achieves single-perspective convergence.
Figure 12:
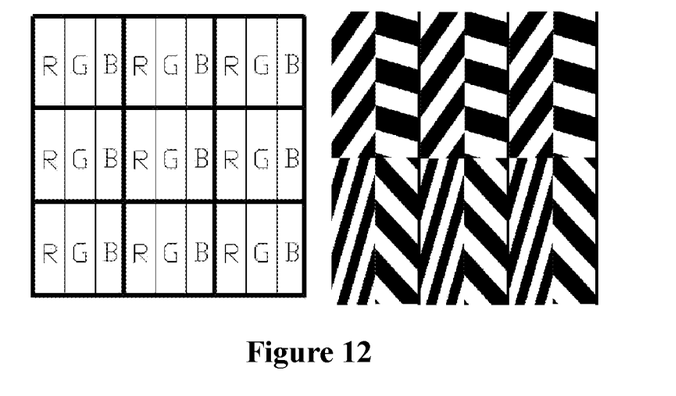
FIG. 12 shows sizes of R, G and B sub-pixels in a liquid crystal screen corresponding to rectangular pixels of the directional projection screen.

Reference is made to FIG. 11, which is diagram of distribution of nano structures of a directional projection screen that achieves single-perspective convergence. A nano structure 1001 corresponds to one off-axis hologram structure, which allows the image to be converged at a viewpoint 1. The pixels in the figure are not limited to rectangular pixels, and may be of other pixel structures such as circular or hexagonal pixels. Referring to FIG. 12, rectangular pixels which correspond to R, G and B sub-pixel sizes in a liquid crystal screen are adopted in the directional projection screen.

Figure 13:
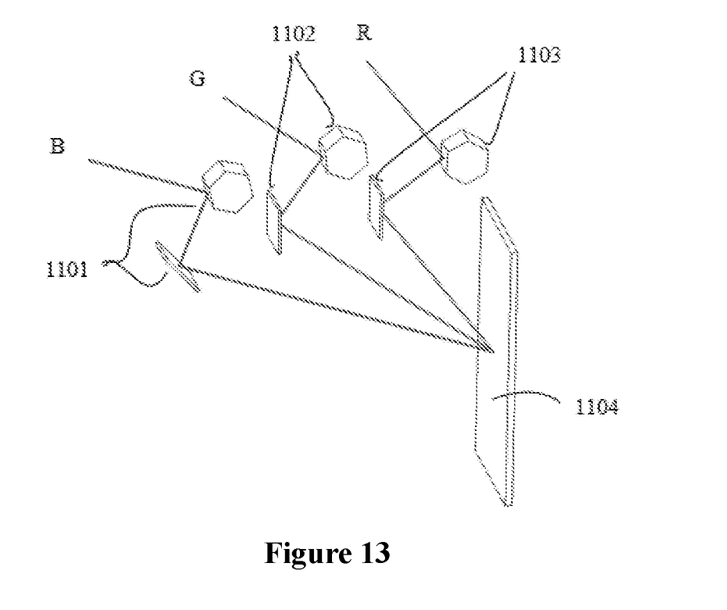
FIG. 13 is a diagram of a laser scanning engine of a naked eye 3D display device.

FIG. 13 is a diagram of a laser scanning engine of a naked eye 3D display device. The engine includes three laser light sources R, G, B with different wavelengths, three sets of scanning mirrors 1101,1102 and 1103, and a display screen 1104. Light from the three laser light sources R, G, B with different wavelengths passes through a corresponding column scanning mirror and a corresponding line scanning mirror, and illuminates in a back surface of the display screen. By rotating the column scanning mirror up and down, the laser light source is moved up and down on the screen. By rotating the line scanning mirror left and right, the laser light source is moved left and right on the screen.

The nano-grating pixels in the directional projection screen according to the present disclosure may be fabricated by ultraviolet continuous variable spatial frequency lithography and nano-imprint. The ultraviolet continuous variable spatial frequency lithography technique refers to a lithographic apparatus and a lithography method in Chinese Patent Application No. CN201310166341.1. The nano-grating may be of an embossed structure. In the present disclosure, the nano-gratings may be manufactured by etching a surface of the directional projection screen with the lithography method, or may be manufactured in batches by nano-imprinting, using a template for imprinting, to form the nano-grating pixel array, thereby reducing a cost of the screen. A directional projection screen of a reflection type may be achieved by plating metal on the surface of a directional projection screen of a transmission type. The price and cost of red, green and blue lasers (LD or DPSSL) have satisfied the application requirements.

In the present disclosure, the size of one single pixel of the directional projection screen may be adjusted according to a screen resolution, and 2D/3D switching may be realized. Multiple images (n) from different perspectives correspond to directional pixels (n) respectively, and form a 3D image display. With single-perspective images rather than multi-perspective images, a 2D display may be achieved, and the size of pixel of the 2D image is equal to "n*size of directional pixel". Since the size of pixel may be manufactured to be very small, such as 20 microns, the size of pixel of the 2D image is 60 microns in a case that there are 9 viewpoints, which does not affect the 2D image resolution of the display screen.

In the present disclosure, the stereoscopic image display is realized by a direct spatial modulation of the directional projection screen, three-color laser sources of a beam expander type, and the laser light source providing the multi-perspective image. The laser light source provides amplitude information of the image, the directional projection screen provides phase (perspective) information, and a beam expander light field of the three-color laser sources placed specifically provide backlighting, and the naked eye 3D laser display device of the present disclosure is achieved. The displayed stereoscopic image has the same characteristics as the hologram. In other words, the three-dimensional image observed with the naked eye 3D laser display device of the present disclosure is the same as the actual three-dimensional image. There is no visual fatigue due to a long observation, which is advantageous for vision protection. Since a wavefront transformation is performed on the image of the present disclosure by the directional projection screen and convergent multiple-viewpoint is formed. Theoretically, the number of viewpoints may be 1000 or more. Multi-perspective images have no crosstalk in space, and the diffusion relationship of viewpoints is not affected by light propagation. Therefore, 3D images are displayed correctly with different observation distances, and are not limited by the distance. Meanwhile, the observable perspective for the 3D images can reach 150 degrees or more due to the nano structures. The directional projection screen may be of a transmission type or a reflection type according to the incidence mode.

In view of the above, the present disclosure discloses a pixelated directional projection screen and a naked eye 3D display device including the directional projection screen. In the present disclosure, the light from the three-color light sources of RBG (or other three colors) is incident, with a specific angle and position, on a directional projection screen having a nano-grating pixel, and form the same emergent light field, and colorful 3D display is achieved by direct spatial modulation for the laser projection light. There is no crosstalk between the viewpoints. There is no visual fatigue when observing the 3D display device with multi-viewpoint directional screen.

It is apparent to those skilled in the art that the present disclosure is not limited to the details of the above embodiments, and the present disclosure may be implemented in other specific manners without departing from the spirit or substantial features thereof. Accordingly, the embodiments should be considered as an example rather than a limitation. The scope of the present disclose is defined by the claims rather than by the foregoing description. Hence all changes within the scope of the claims and equivalents thereof are within the scope of the present disclosure. The claims should not be limited by reference signs of drawings therein.

In addition, understandably, although this specification is described with embodiments, not every embodiment includes only one independent technical solution, and the description is merely for a better understanding. Those skilled in the art should refer to the specification as a whole. The technical solutions in the embodiments may also be suitably combined to form other embodiments which can be understood by those skilled in the art.

The invention claimed is:

1. A naked eye 3D laser display device, comprising:
a transmission or reflection type of directional projection screen with a first surface and a second surface opposite the first surface, wherein the first surface has a plurality of nano-grating structures constituting a plurality of nano-grating pixel arrays, wherein each of the plurality of nano-grating structures has a different period and orientation angle;
a plurality of laser light sources, configured to provide multi-perspective image pixels which match the plurality of nano-grating pixel arrays on the directional projection screen,
wherein the plurality of laser light sources comprises at least a red monochromatic laser light source, a green monochromatic laser light source and a blue monochromatic laser light source;
wherein different incident angles are formed between incident light emitted from the red, green and blue monochromatic laser light sources toward a corresponding target nano-grating and a normal line of one of the first surface and the second surface;
wherein the incident light emitted from the red, green and blue monochromatic laser light sources are reflected toward outside of the directional projection screen by the one of the first surface and the second surface or are transmitted into the directional projection screen from the one of the first surface and the second surface to form transmitted light, at least a portion of the transmitted light arriving at the target nano-grating without suffering from internal reflection in the directional projection screen;
wherein red, green and blue light from the target nano-grating are converged by the directional projection screen to one emitting direction and one spatial viewpoint, and a convergent viewpoint is formed by imaging of perspective images;
wherein the nano-grating pixel arrays in different groups have different convergent viewpoint positions, and the directional projection screen and the red, green and blue monochromatic laser light sources operate in combination through direct spatial modulation to realize a stereoscopic image display;
wherein the period and orientation angle of the nano-grating structure are calculated according to the following equations once a wavelength of incident light, an incident angle of incident light, a diffraction angle of diffractive light, and an azimuth of diffractive light are determined:

$$\tan \varphi_1 = \sin \varphi / (\cos \varphi - n \sin \theta (\Lambda/\lambda)) \quad (1)$$

$$\sin^2(\theta_1) = (\lambda/\Lambda)^2 + (n \sin \theta)^2 - 2n \sin \theta \cos \varphi (\lambda/\Lambda), \quad (2)$$

wherein $\theta_1$ and $\varphi_1$ represent the diffraction angle and the azimuth of diffractive light respectively, $\theta$ and $\lambda$ represent the incident angle and the wavelength of a corresponding one of the red, green and blue monochromatic laser light sources respectively, $\Lambda$ and $\varphi$ represent the period and the orientation angle of a corresponding one of the plurality of nano-grating structures respectively, and n represents a refractive index of light wave in the directional projection screen.

2. The naked eye 3D laser display device according to claim 1,
wherein, the incident angles are different from each other and comprise a first incident angle between the incident light emitted from the red monochromatic laser light source and the normal line of the one of the first surface and the second surface, a second incident angle between the incident light emitted from the green monochromatic laser light source and the normal line of the one of the first surface and the second surface, and a third incident angle between the incident light emitted from the blue monochromatic laser light source and the normal line of the one of the first surface and the second surface, and
wherein the first incident angle is greater than the second incident angle, the second incident angle is greater than the third incident angle.

3. The naked eye 3D laser display device according to claim 1, wherein viewpoints of the plurality of nano-grating pixel arrays are distributed on a two-dimensional plane.

4. The naked eye 3D laser display device according to claim 1, wherein
the nano-grating structures with different directions are etched on the first surface of the directional projection screen by photoetching, or the nano-grating structures are imprinted in batches by nano-imprinting, using a template for imprinting, so as to form the plurality of nano-grating pixel arrays.

5. The naked eye 3D laser display device according to claim 1, wherein the red, green and blue monochromatic laser light sources adopt a center of a plane as a zero position in an X-axis direction;

in a YZ plane, the red, green and blue monochromatic laser light sources are at a same position in a Y-axis direction and at different positions in a Z-axis direction;

the plurality of nano-grating structures correspond to a plurality of viewpoints respectively, each of the plurality of viewpoints corresponds to one image, and each image corresponding to each of the plurality of viewpoints is divided into three monochromatic images based on three colors of RBG or based on other three colors;

the red, green and blue monochromatic laser light sources scan, more than once, a monochromatic image on the directional projection screen, of which a color corresponds to a perspective;

the red, green and blue monochromatic laser light sources with different wavelengths scan synchronously, and each of the red, green and blue monochromatic laser light sources scans more than once; and the directional projection screen converges the red, green and blue light and realizes a colorful stereoscopic image display.

6. The naked eye 3D laser display device according to claim 1, wherein the directional projection screen is of the reflection type and comprises a metal layer.

7. The naked eye 3D laser display device according to claim 1, wherein the directional projection screen is of the transmission type, and the red, green, and blue light are incident from a same position on the second surface of the directional projection screen, passes through nano-gratings arranged on the first surface of the directional projection screen, and form emergent light with a same diffraction angle.

8. The naked eye 3D laser display device according to claim 1, wherein the directional projection screen is of the reflection type, and the red, green, and blue light are incident from a same position on the first surface of the directional projection screen, passes through nano-grating pixels arranged on the first surface of the directional projection screen, and form emergent light with a same diffraction angle.

9. The naked eye 3D laser display device according to claim 1,
wherein the directional projection screen is of the transmission type, and
wherein the red, green and blue monochromatic laser light sources are at a zero position in an X-axis direction in a XZ plane, at a same position in a Y-axis direction and at different positions in a negative direction of a Z-axis in a YZ plane.

10. The naked eye 3D laser display device according to claim 1,
wherein the directional projection screen is of the reflection type, and
wherein the red, green and blue monochromatic laser light sources are at a zero position in an X-axis direction in a XZ plane, at a same position in a Y-axis direction and at different positions in a positive direction of a Z-axis in a YZ plane.

11. The naked eye 3D laser display device according to claim 1, wherein the red, green and blue monochromatic laser light sources are located at different distances from one of the first surface and the second surface.

* * * * *